(12) United States Patent
Cook et al.

(10) Patent No.: US 10,683,023 B1
(45) Date of Patent: Jun. 16, 2020

(54) POWERED WHEELBARROW

(71) Applicant: Stinger Equipment, Inc., LaGrange, KY (US)

(72) Inventors: David Michael Cook, LaGrange, KY (US); Joshua Michael Otto, Crestwood, KY (US)

(73) Assignee: Stinger Equipment, Inc., LaGrange, KY (US)

( * ) Notice: Subject to any disclaimer, the term of this patent is extended or adjusted under 35 U.S.C. 154(b) by 0 days.

(21) Appl. No.: 15/913,206

(22) Filed: Mar. 6, 2018

Related U.S. Application Data

(60) Provisional application No. 62/468,188, filed on Mar. 7, 2017.

(51) Int. Cl.
*B62B 5/00* (2006.01)
*B62B 1/18* (2006.01)
*F16H 47/02* (2006.01)

(52) U.S. Cl.
CPC .............. *B62B 5/0026* (2013.01); *B62B 1/18* (2013.01); *B62B 5/0066* (2013.01); *B62B 5/003* (2013.01); *B62B 5/0033* (2013.01); *F16H 47/02* (2013.01)

(58) Field of Classification Search
CPC .................. B62B 1/18; B62B 5/0026–005
See application file for complete search history.

(56) References Cited

U.S. PATENT DOCUMENTS

| | | | | |
|---|---|---|---|---|
| 1,014,475 | A * | 1/1912 | Holloway | B65F 1/02 |
| | | | | 190/18 A |
| 5,067,737 | A * | 11/1991 | Broeske | B62B 1/22 |
| | | | | 280/47.31 |
| 5,211,254 | A * | 5/1993 | Harris, III | B62B 5/0026 |
| | | | | 180/19.1 |
| 7,243,939 | B2 * | 7/2007 | Lowe | B62B 1/208 |
| | | | | 280/42 |
| 8,869,922 | B1 * | 10/2014 | Isola | B62B 5/003 |
| | | | | 180/19.1 |
| 9,986,731 | B2 * | 6/2018 | Mitchell | A01M 31/006 |
| 10,046,781 | B2 * | 8/2018 | Dumas | B62B 1/202 |
| 10,099,732 | B2 * | 10/2018 | Ho | B62B 5/0026 |
| 2010/0044125 | A1 * | 2/2010 | Witzigman | A01M 31/006 |
| | | | | 180/19.3 |
| 2014/0367934 | A1 * | 12/2014 | Ludlow | B62B 1/18 |
| | | | | 280/47.26 |

FOREIGN PATENT DOCUMENTS

| | | | | |
|---|---|---|---|---|
| DE | 20109039 U1 * | 8/2001 | | B62B 1/18 |
| WO | WO-2010147630 A1 * | 12/2010 | | B62B 1/18 |
| WO | WO-2015074091 A1 * | 5/2015 | | B62B 1/202 |

* cited by examiner

*Primary Examiner* — Kevin Hurley
(74) *Attorney, Agent, or Firm* — Middleton Reutlinger

(57) ABSTRACT

The wheelbarrow of the present embodiments provides a frame and a tub wherein the tub has a recess for receiving at least a portion of a wheel. Additionally, at least a portion of the frame and a portion of the tub may extend forward of the wheel. Further, a distance between a center of gravity of the tub and a vertical line or plane bisecting a rotational axis of the wheel when the wheelbarrow is in a resting position may be approximately equal to or less than a radius of the wheel. Also, the wheelbarrow may be powered by an engine or motor. The wheelbarrow may also include a transmission capable of rotating the wheel in a forward or reverse direction. Moreover, the wheelbarrow may contain control levers located adjacent handle grips for controlling the motor or engine, or the transmission.

16 Claims, 14 Drawing Sheets

POWERED WHEELBARROW

BACKGROUND

The standard wheelbarrow consists of a wheel out front, handles, and an area for transporting materials. Traditionally, wheelbarrows center the load directly behind a single front wheel and require the user to lift, balance, and push the load to the desired location.

Since the invention of the above wheelbarrow, people have tried to improve on this basic design. They have made wheelbarrows with two wheels to balance the load, but this prevents them from transporting across hills because they tip over. They have made wheelbarrows that have dumping features so you do not have to lift the handles to dump, but this makes the wheelbarrow heavy, expensive, and this action is slower than just lifting the handles to dump. In recent years, gas or electric powered wheelbarrows have come to market to assist in moving the load from point A to point B.

Even with the power assist wheelbarrow, the wheelbarrow is limited because the user has to lift on average 25% or more of the load with the handles when transporting. Additionally, with a powered wheelbarrow comes a larger capacity tub which also raises the center of gravity of the unit. This higher center of gravity makes balancing harder and more likely to tip during use. With these limitations on a powered wheelbarrow, many contractors use 4-wheel, gas powered buggies that may weigh in excess of 350 pounds to transport larger loads than a traditional wheelbarrow can handle. These larger buggies are expensive, slower to transport and dump, damage turf where used, and require a trailer to transport them.

Another limiting feature of motorized wheelbarrows is their inability to control heavy loads through varying terrain or on hills. Motorized wheel barrows utilize a gas engine, and some type of clutch (manual or centrifugal) to engage the engine to the drive wheel to power it forward. When disengaged, the front wheel is free to roll allowing a heavy load to pull the operator down a hill uncontrollably. Some powered wheelbarrows may have a hand brake which the operator can use to help control a load in such an instance but it adds more complexity and chance for failure resulting in a dangerous situation. With these clutched motorized units, they do not offer reverse or the ability for the operator to change direction easily with a heavy load.

With all of these problems, it is easy to see why current powered wheelbarrows are not widely used. Thus, there is a need in the art for a wheelbarrow that is powered, light weight, easy to use, has powered forward and reverse, controls speed on hills, and improves on balancing the load making it easier for the operator to move larger and heavier loads than before.

SUMMARY

A wheelbarrow comprises, a frame, a tub mounted to the frame, a wheel, wherein the tub has a recess, wherein at least a portion of the wheel is positioned within the recess, and wherein at least a portion of the frame and at least a portion of the tub extend forward of the wheel. A distance between a center of gravity of the tub and a vertical line or plane bisecting a rotational axis of the wheel when the wheelbarrow is in a resting position may be approximately equal to or less than a radius of the wheel. The wheelbarrow may be powered and may further comprise a motor or engine. The wheelbarrow may further comprise a transmission. The transmission may be a hydrostatic drive. Further, the transmission may be capable of rotating the wheel in both a forward direction and in a reverse direction. The frame may include at least one handle grip and wherein the motor or engine may be controlled by at least one control lever. The control lever may be located adjacent to the at least one handle grip.

A wheelbarrow comprises, a frame, a tub mounted to the frame, a wheel, wherein at least a portion of the wheel is positioned within a recess of the tub, and wherein the wheel is powered. At least a portion of the frame and at least a portion of the tub may extend forward of the wheel. A distance between a center of gravity of the tub and a vertical line or plane bisecting a rotational axis of the wheel when the wheelbarrow is in a resting position may be approximately equal to or less than a radius of the wheel. The wheelbarrow may further comprise a motor or engine. The wheelbarrow may further comprise a transmission. The transmission may be a hydrostatic drive. The transmission may be capable of rotating the wheel in both a forward direction and in a reverse direction. The frame may include at least one handle grip and wherein the transmission may be controlled by at least one control lever. The at least one control lever may be located adjacent to the at least one handle grip.

DETAILED DESCRIPTION

Figure 1:
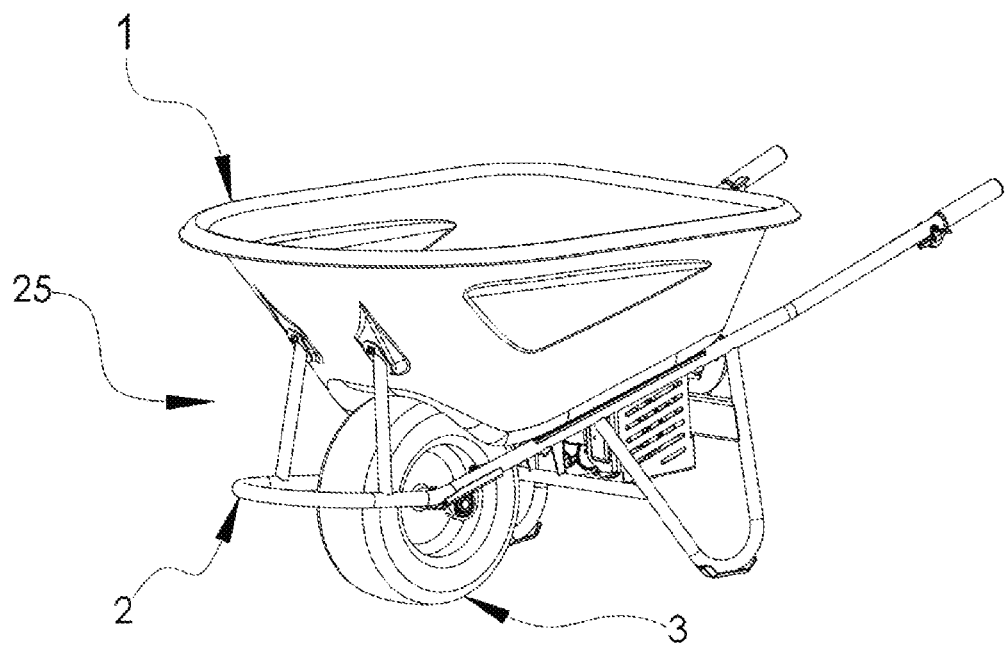
FIG. 1 is an isometric view of an embodiment of a powered wheelbarrow.
Figure 2:
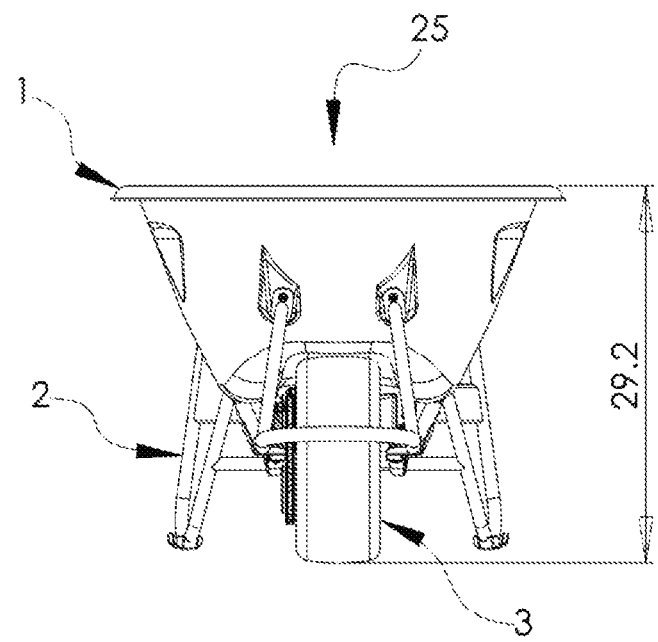
FIG. 2 is a front view of the wheelbarrow in FIG. 1.
Figure 3:
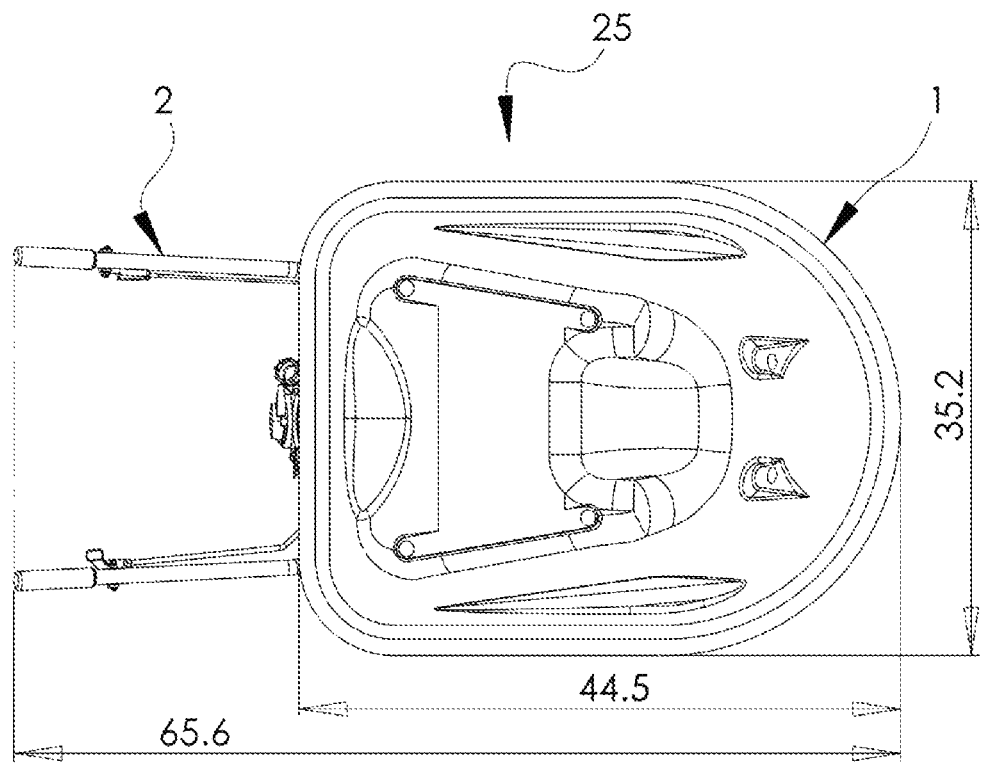
FIG. 3 is a top view of the wheelbarrow in FIG. 1.
Figure 4:
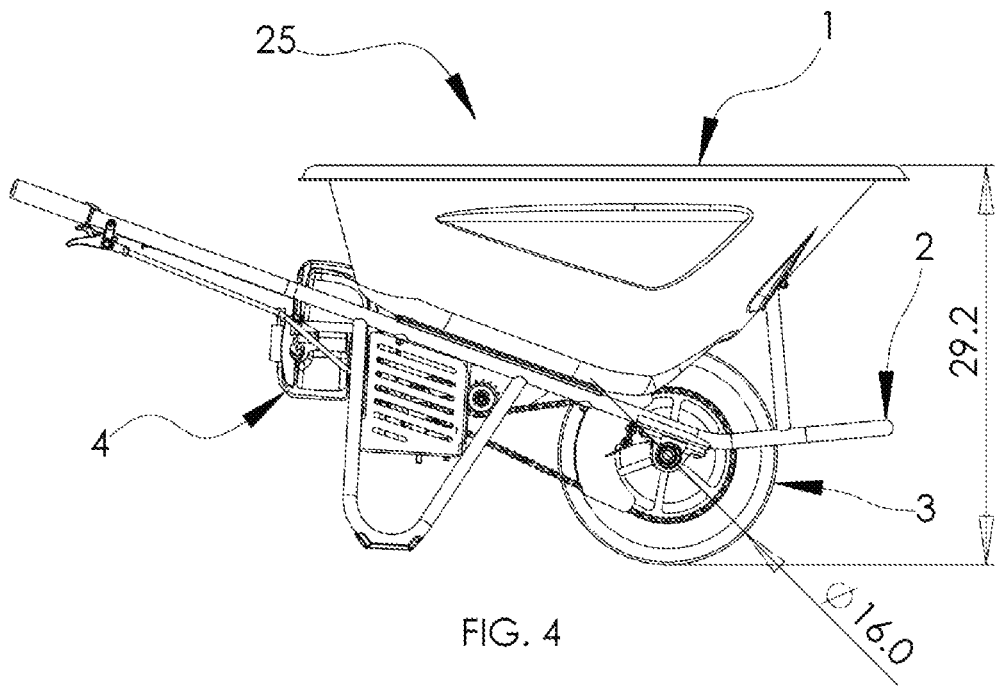
FIG. 4 is a side view of the wheelbarrow in FIG. 1.
Figure 5:
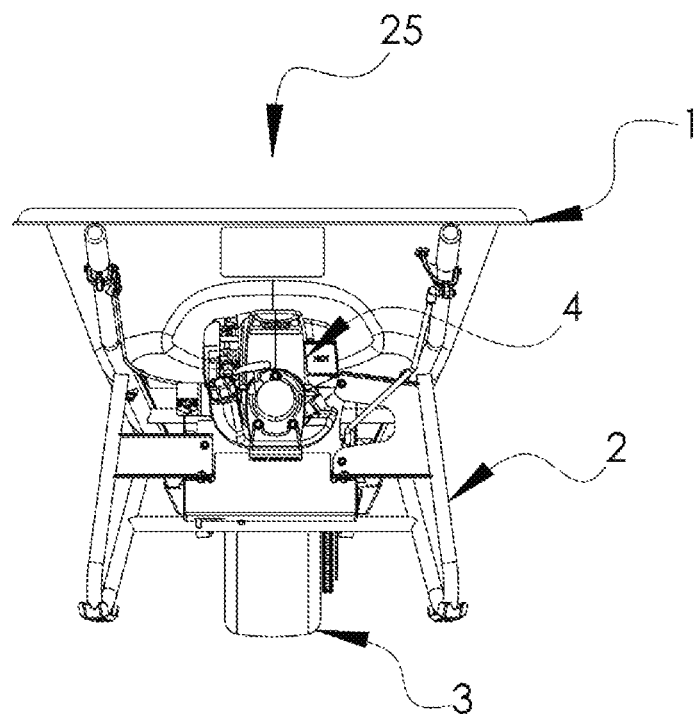
FIG. 5 is a rear view of the wheelbarrow in FIG. 1.

FIGS. 1-17 show one embodiment of a powered wheelbarrow 25. The dimensions shown in FIGS. 1-17 are in inches unless otherwise noted. The powered wheelbarrow 25 includes a frame 2, having front, rear, left and right sides, on which is mounted a tub 1 for holding material, a front drive wheel 3 for movement of the unit, a transmission 11 for providing power to the drive wheel 3 for variable speed with forward and reverse, an engine 4 for providing power to the transmission, control lever 5 for providing input (forward and reverse control) to the transmission 11, and a throttle lever 9 for allowing to increase power output of the engine 4.

Figure 6:
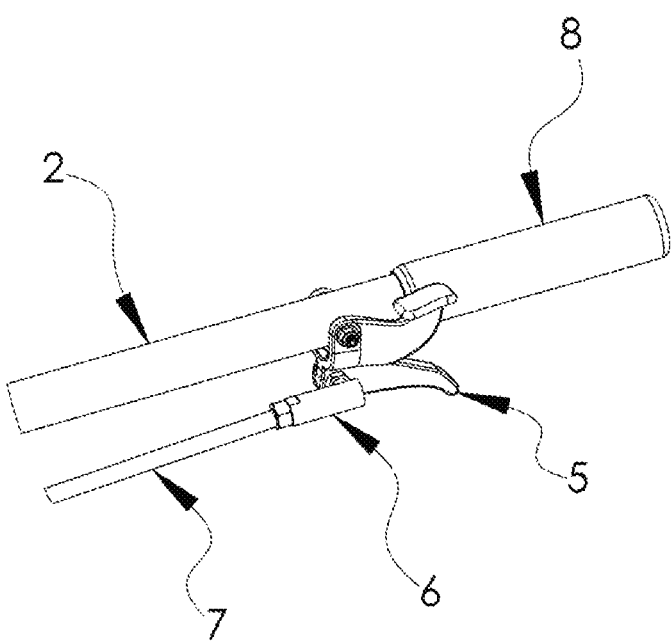
FIG. 6 is a detailed view of the forward and reverse controls of the wheelbarrow in FIG. 1.

FIG. 6 shows the control lever 5 that allows the operator to control the speed and direction of the powered wheelbarrow 25. Squeezing the control lever 5 with the index finger provides forward motion to the powered wheelbarrow 25 while still allowing the operator to have a firm grasp of the handle grip 8. As control lever 5 is moved or pivoted in the upward direction (i.e., squeezing with the index finger) the speed of the wheelbarrow 25 increases in the forward direction. In other words, the more the control lever 5 pivots upward, the faster drive wheel 3 will rotate in the forward direction. Pressing down on the control lever 5, with ones thumb on the thumb pad, provides rearward motion to the powered wheelbarrow 25 while still allowing the operator to have a firm grasp of the handle grip 8. As control lever 5 is moved or pivoted in the downward direction (i.e., pushing down with the thumb) the speed of the wheelbarrow 25 increases in the reverse direction. In other words, the more the control lever 5 pivots downward, the faster the drive wheel 3 will rotate in the reverse direction. The control lever 5, is pivotally mounted to the frame 2 about an axis perpendicular to the frame 2. The control lever 5 transmits motions through the rod-end 6, which is connected to the control rod 7, and down to the input control arm 18 of the transmission 11.

Figure 7:
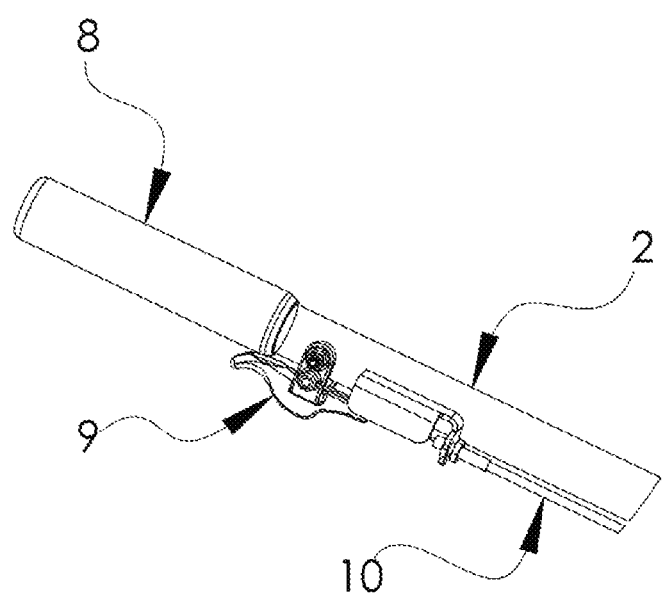
FIG. 7 is a detailed view of the throttle control of the wheelbarrow in FIG. 1.

FIG. 7 shows the throttle control lever 9 that allows the operator to increase the speed and power output from the engine 4 to the input on the transmission 11. The throttle control lever 9, at the rest position, is adjusted to provide enough power to the transmission to power the unit under normal conditions. In the event more power is needed the operator squeezes the throttle control lever 9 (i.e., pivots the throttle control lever 9 in the upward direction) to increase the power output of the engine 4. The throttle control lever 9, is pivotally mounted to the frame 2 about an axis that is perpendicular to the frame 2. The throttle control lever 9 transmits motion from the throttle control lever 9 through the control cable 10, to the engine 4 to increase the power output.

Figure 8:
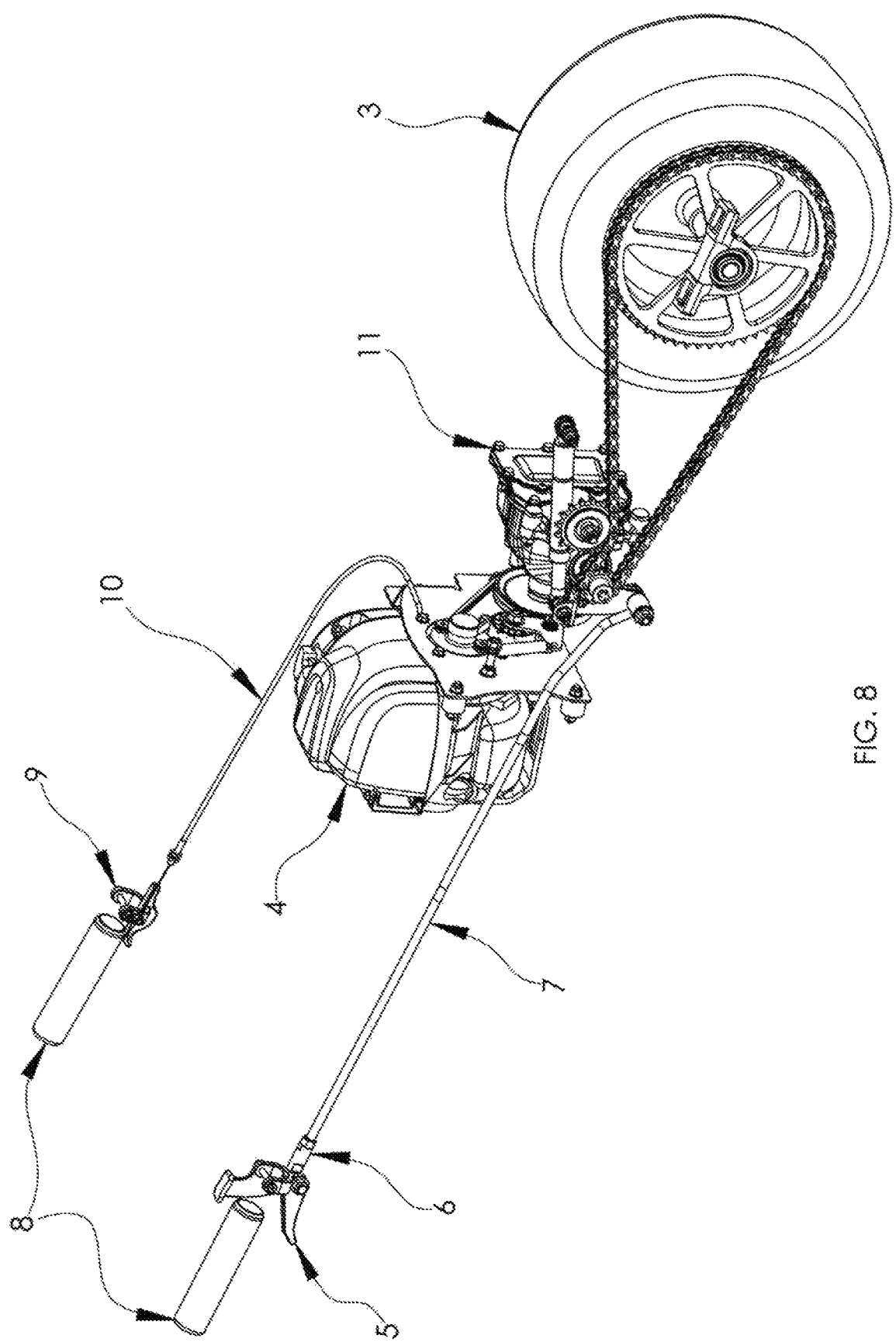
FIG. 8 is an isometric view of the drive system of the wheelbarrow in FIG. 1.

FIG. 8 shows the entire drive system that powers the wheelbarrow 25. The drive wheel 3 is at the front of the drive system, the directional and speed control lever 5 is on the right side of the drive system and the throttle control lever 9 is on the left side of the drive system. In this example, the drive wheel 3 is approximately 16 inches in diameter. The controls (5,9) are setup so the user can grasp the hand grips 8 to control the wheelbarrow 25 during use like a normal wheelbarrow while still being able to utilize the controls using only index fingers for forward movement and increasing the power output of the engine, and a thumb for reversing the unit.

Figure 9:
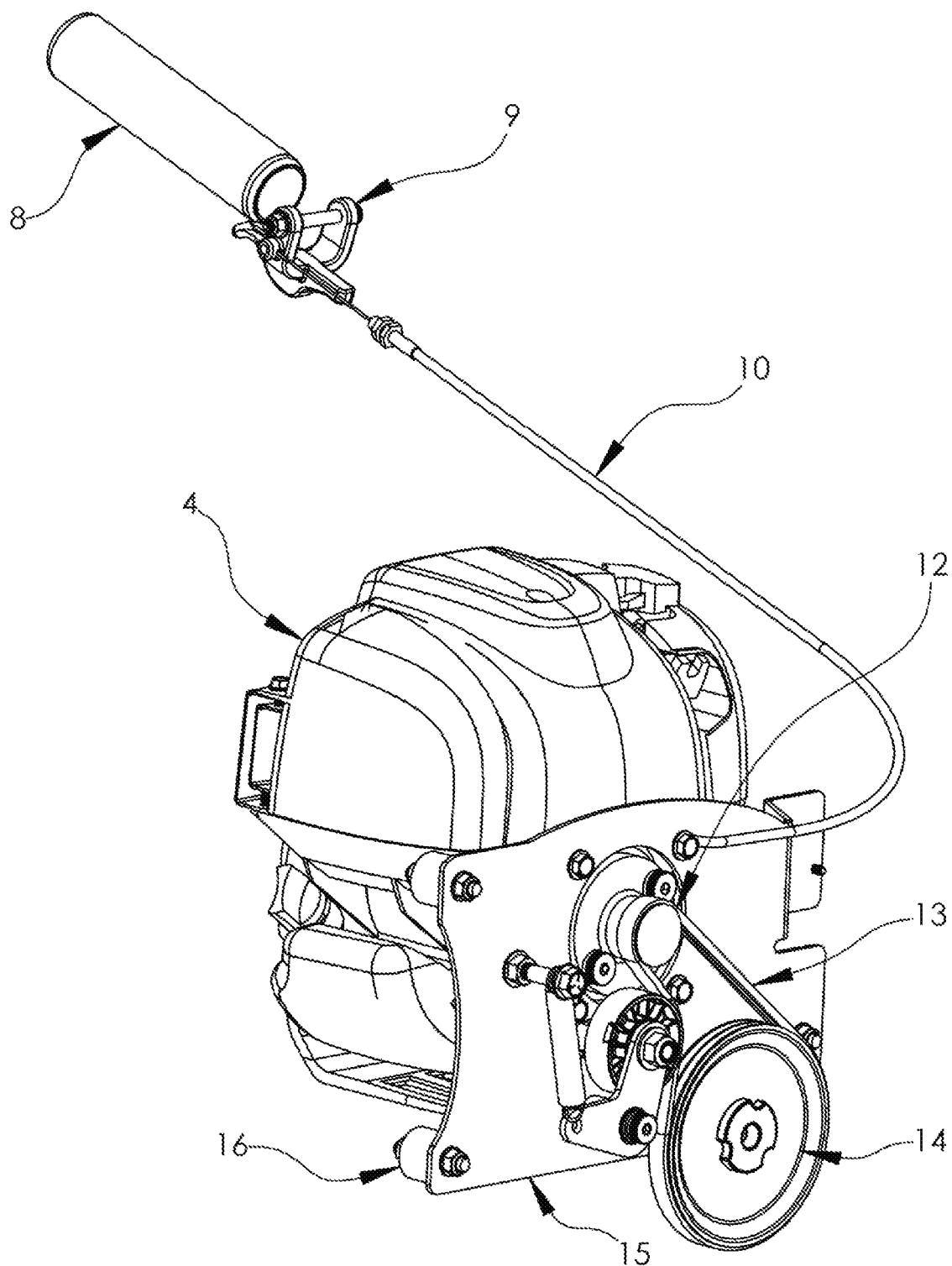
FIG. 9 is a detailed view of the throttle, engine, and belt drive of the wheelbarrow in FIG. 1.

FIG. 9 shows the engine assembly, where the power from the engine 4 is transmitted from the engine pulley 12, through the transmission belt 13 to the input pulley on the transmission 14. There is a spring-loaded tensioner shown that keeps constant tension on the belt 13 at all times keeping the engine 4 fully engaged (not clutched) to the transmission 11 at all times.

Figure 10:
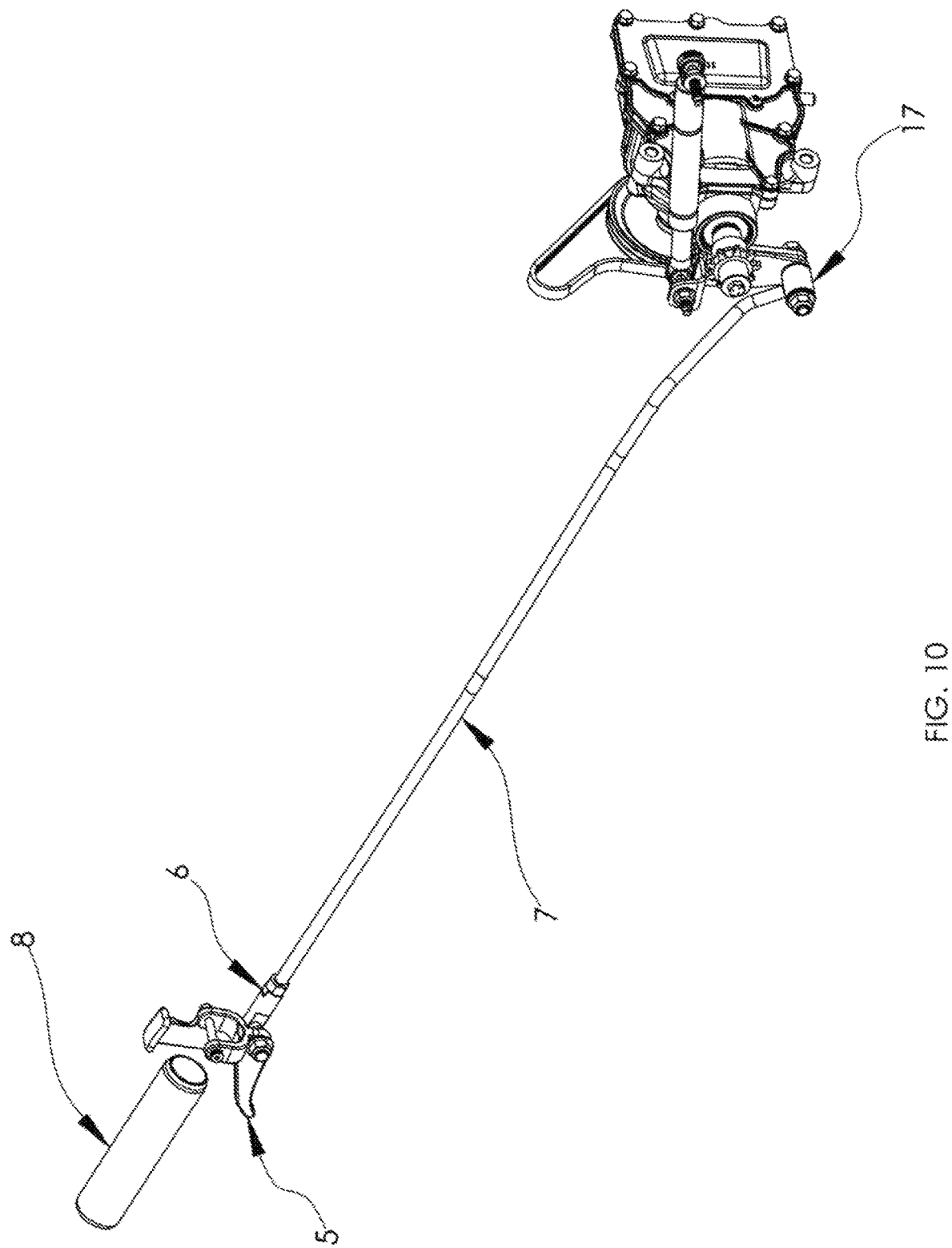
FIG. 10 is a detailed view of the motion control handle, linkage, and hydrostatic drive of the wheelbarrow in FIG. 1.

FIG. 10 shows the transmission assembly and the control linkage 7 used to control speed and direction of the wheelbarrow 25. While grasping the hand grip 8, the user can squeeze the control lever 5 with the index finger to control the forward speed. Additionally, the user can press down with the thumb on the thumb pad on the control lever 5 to control the reverse speed. The motion on the control lever 5, is transmitted through the rod-end 6 through the control lever 7 to the pivot point 17 which connects to the input arm on the transmission 11. This "transmission" is an integrated hydrostatic drive. The integrated hydrostatic drive includes an input shaft that receives power from the engine, an input arm that controls movement of the swashplate that controls the variable displacement and direction of the hydraulic pump, a hydraulic motor which takes the flow from the pump and transmits that into rotational power (forward and reverse) that is sent through the output shaft. In this example, the hydrostatic drive is always engaged providing directional control and braking for the unit. In the event the user needs to roll the unit without running the engine, the unit has a hydraulic bypass valve that allows the unit to roll if this valve is opened by the operator. This valve provides a bypass instead of the closed hydraulic loop between the hydraulic pump and motor during the normal drive condition. Various types of hydrostatic drives are available on the market, but this hydrostatic drive is manufactured by Hydro-Gear of Sullivan, Ill.

Figure 11:
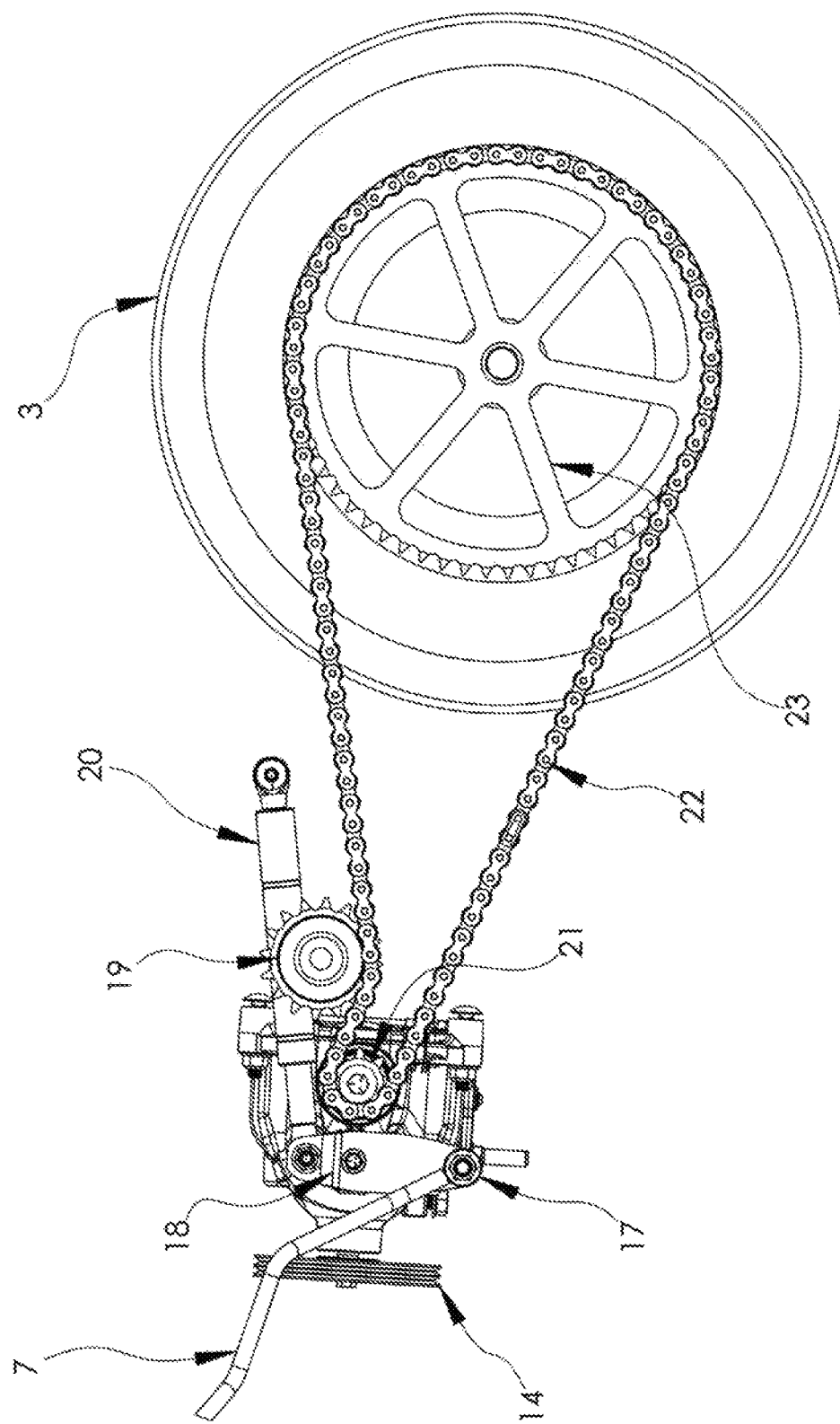
FIG. 11 is a detailed side view of the hydrostatic drive with drive chain of the wheelbarrow in FIG. 1.

FIG. 11 shows how the rotation output from the transmission 11, is transmitted through a driven sprocket 21 on the output shaft of the transmission 11 through the chain 22 to the drive sprocket 23 which transmits rotational movement though the drive axle to the drive wheel 3. There is a chain tensioner 19 that is adjustable to keep the correct tension on the drive chain 22. The damper 20 is used to self-center the input control arm for a neutral position. The control rod 7 can push or pull on the pivot point 17 which rotates the input control arm 18 on the transmission in a clockwise or counter clockwise direction. In this application, if the input control arm 18 is rotated in the clockwise direction the unit moves forward. If the input control arm 18 is rotated in the counter-clockwise direction the unit moves in reverse. The greater the movement from the center position the faster the unit will move accordingly.

Figure 12:
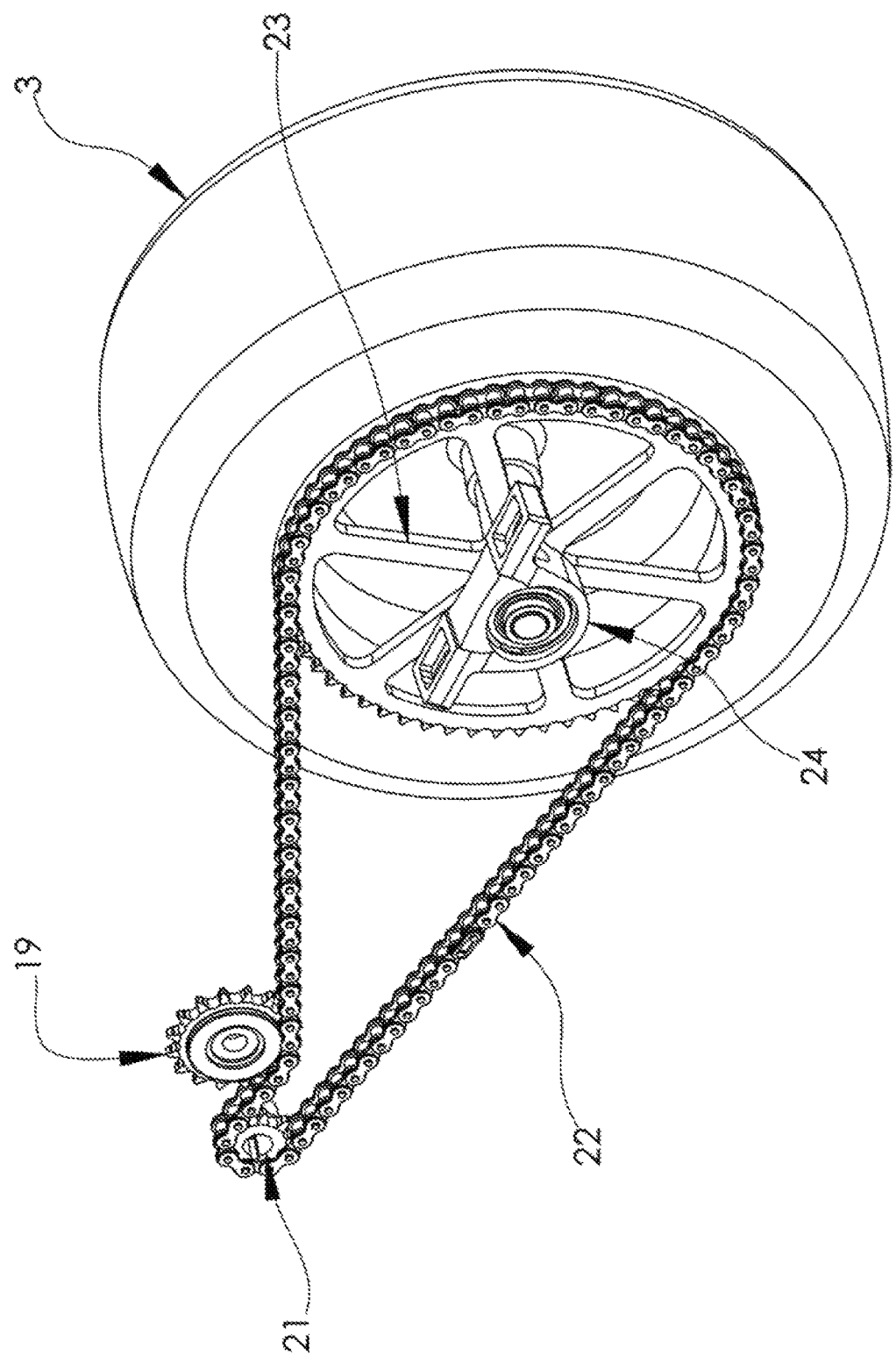
FIG. 12 is a detailed isometric view of the drive wheel assembly and chain of the wheelbarrow in FIG. 1.

FIG. 12 shows the output sprocket 21 from the transmission that is coupled with the chain 22 that transmits power to the front drive sprocket 23. This rotational energy from the chain 22 to the front sprocket 23, is transmitted through an axle to the front drive wheel 3.

Figure 13:
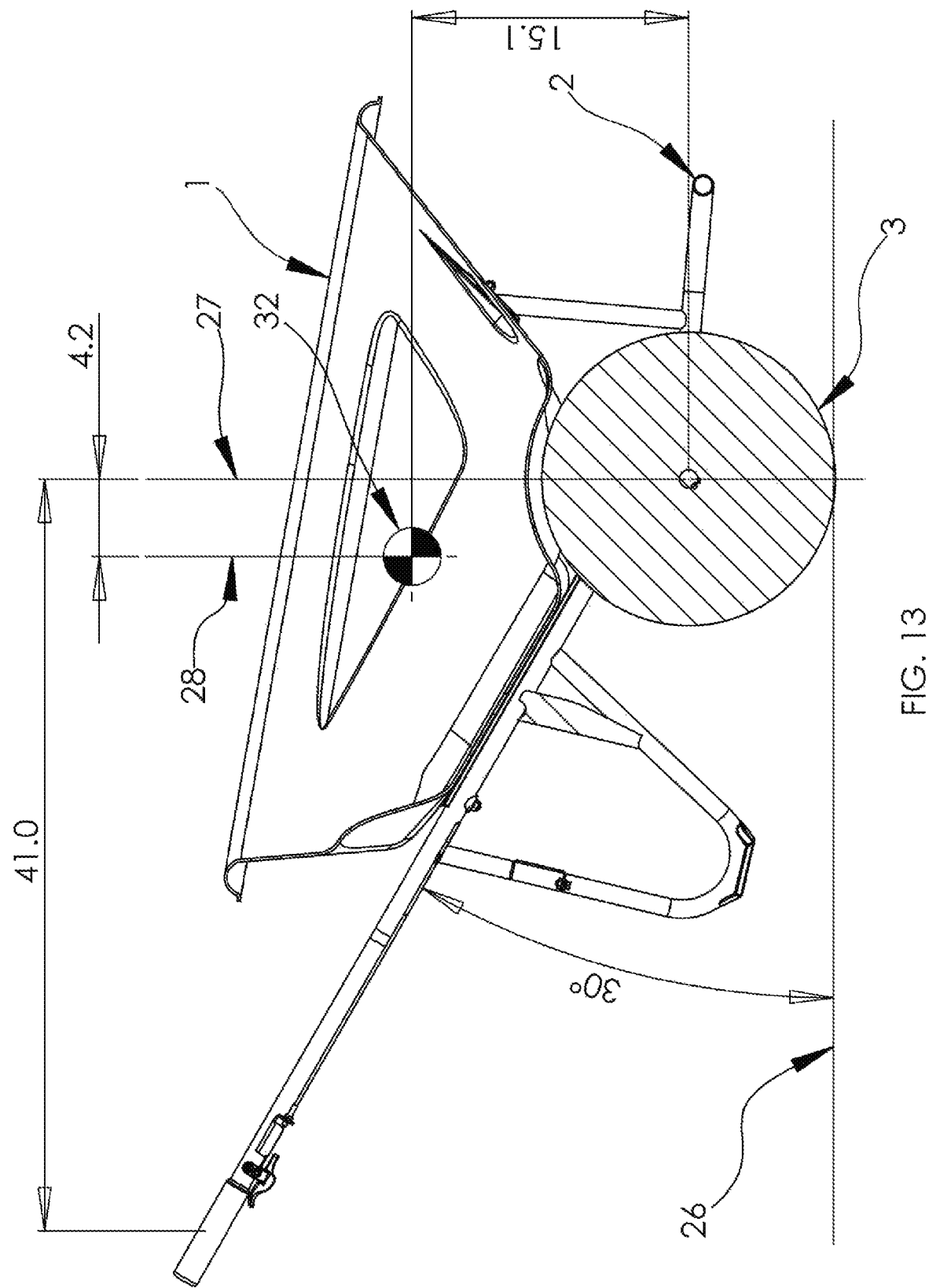
FIG. 13 is a cross-section view of the wheelbarrow in FIG. 1 (with engine and transmission removed) showing the location of the drive wheel in relation to the center of gravity of the tub while the wheelbarrow is in a transport position.

FIG. 13 shows a cross-sectional view of wheelbarrow 25 and tub 1 in relation to the location of the drive wheel 3 in a transport position. Each position shown in FIGS. 13-17 of wheelbarrow 25 is with respect to a horizontal or flat surface or ground 26. In the example in FIG. 13, the handle grips 8 are approximately 30 degrees from horizontal (or ground 26). The center of gravity 32 of the tub 1 is located over the drive wheel 3 instead of behind the wheel like other wheelbarrows. The tub 1 is also at least partially molded around the drive wheel 3 allowing the tub to sit lower to the ground lowering the center of gravity which greatly increases the ease of balancing a load during transport. In this example, the center of gravity 32 is approximately 15.1 inches from, or above a horizontal line or plane bisecting, the rotational axis of drive wheel 3. In other words, the distance between the center of gravity 32 and a horizontal line or plane bisecting the rotational axis of drive wheel 3 is less than the diameter of drive wheel 3. In other examples, the distance between the center of gravity 32 and a horizontal line or plane bisecting the rotational axis of drive wheel 3 can be approximately equal to or less than the diameter of drive wheel 3. Additionally, as the user raises the handles to the operating (transport) position, the center of gravity 32 moves forward making it very easy to handle heavy loads. In this example, the center of gravity 32 in the transport position is only approximately 4.2 inches from vertical line or plane 27 (i.e., the vertical plane bisecting the rotational axis of drive wheel 3) allowing the drive wheel 3 to carry the majority of the load being transported. In other words, the distance between the center of gravity 32 and vertical line or plane 27 is less than the radius of drive wheel 3. In other examples, the distance between the center of gravity 32 and vertical line or plane 27 can be approximately equal to or less than the radius of drive wheel 3. Vertical line or plane 28 bisects the center of gravity 32 and vertical line or plane 27 bisects the axis of rotation of drive wheel 3. The distance from the center of the hand grips 8 to vertical line or plane 27 is approximately 41 inches. This ratio gives a 9.8:1 lever advantage (41 divided by 4.2) on carrying the load. In other words, a user must only lift 1/9.8 of the load. This ratio increases as the handles are lifted higher by the operator. Having the wheel back under the center of gravity 32 and thus the load, provides the user a much greater mechanical advantage to balance heavy loads in the wheelbarrow over traditional wheelbarrows.

Figure 14:
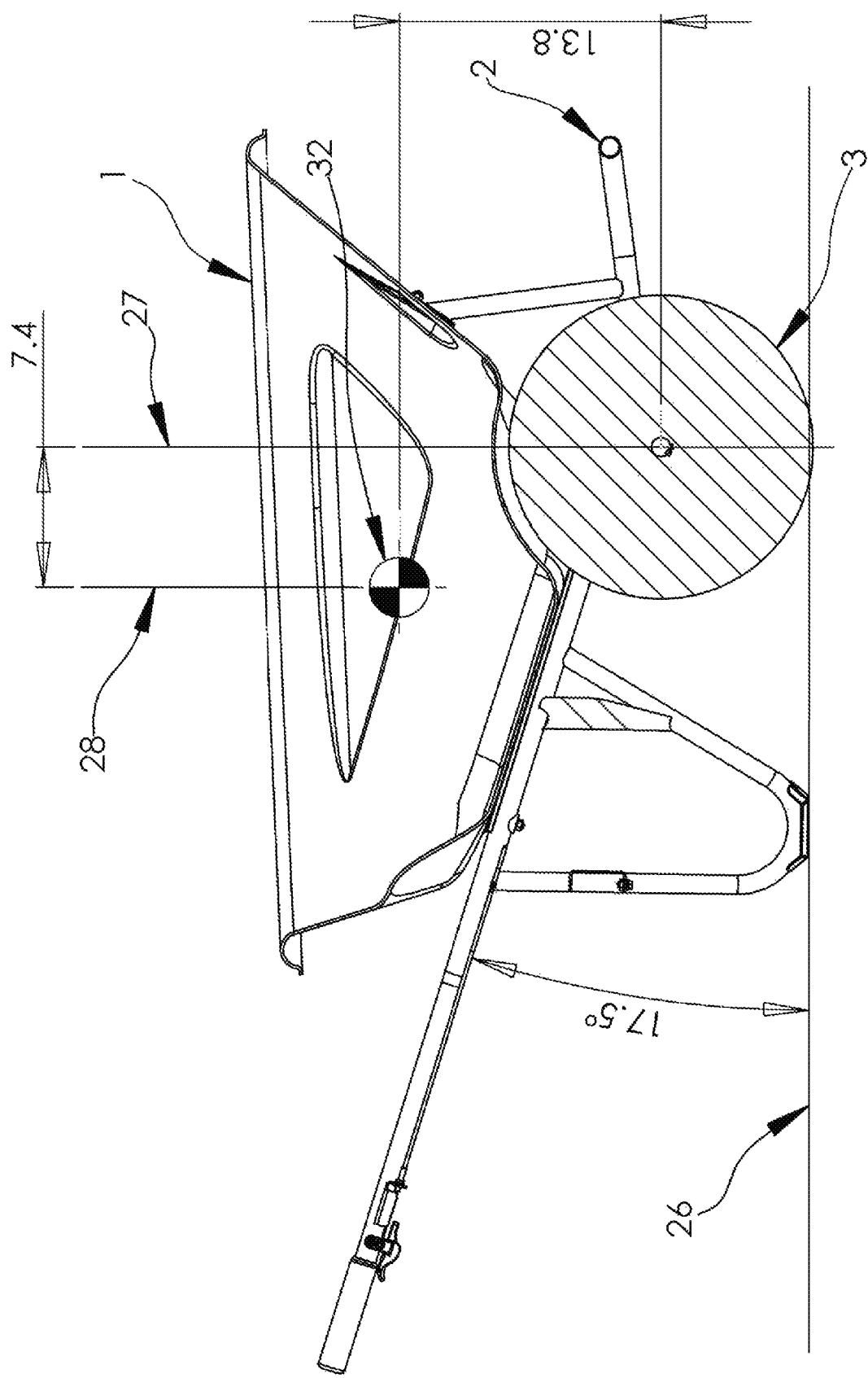
FIG. 14 is a cross-section view of the wheelbarrow in FIG. 1 (with engine and transmission removed) showing the location of the drive wheel in relation to the center of gravity of the tub while the wheelbarrow is in a resting position.

FIG. 14 shows a cross-sectional view of wheelbarrow 25 including tub 1 in a resting position. In this example, the handle grips 8 are approximately 17.5 degrees from horizontal (or ground 26) and the distance of the center of gravity 32 from the vertical line or plane 27 bisecting the axis of rotation of the drive wheel 3 is approximately 7.4 inches. In other words, the distance between the center of gravity 32 and vertical line or plane 27 is less than the radius of drive wheel 3. In other examples, the distance between the center of gravity 32 and vertical line or plane 27 can be approximately equal to or less than the radius of drive wheel 3. Further, the center of gravity 32 is approximately 13.8 inches from, or above a horizontal line or plane bisecting, the rotational axis of drive wheel 3. In other words, the distance between the center of gravity 32 and a horizontal line or plane bisecting the rotational axis of drive wheel 3 is less than the diameter of drive wheel 3. In other examples, the distance between the center of gravity 32 and a horizontal line or plane bisecting the rotational axis of drive wheel 3 can be approximately equal to or less than the diameter of drive wheel 3.

Figure 15:
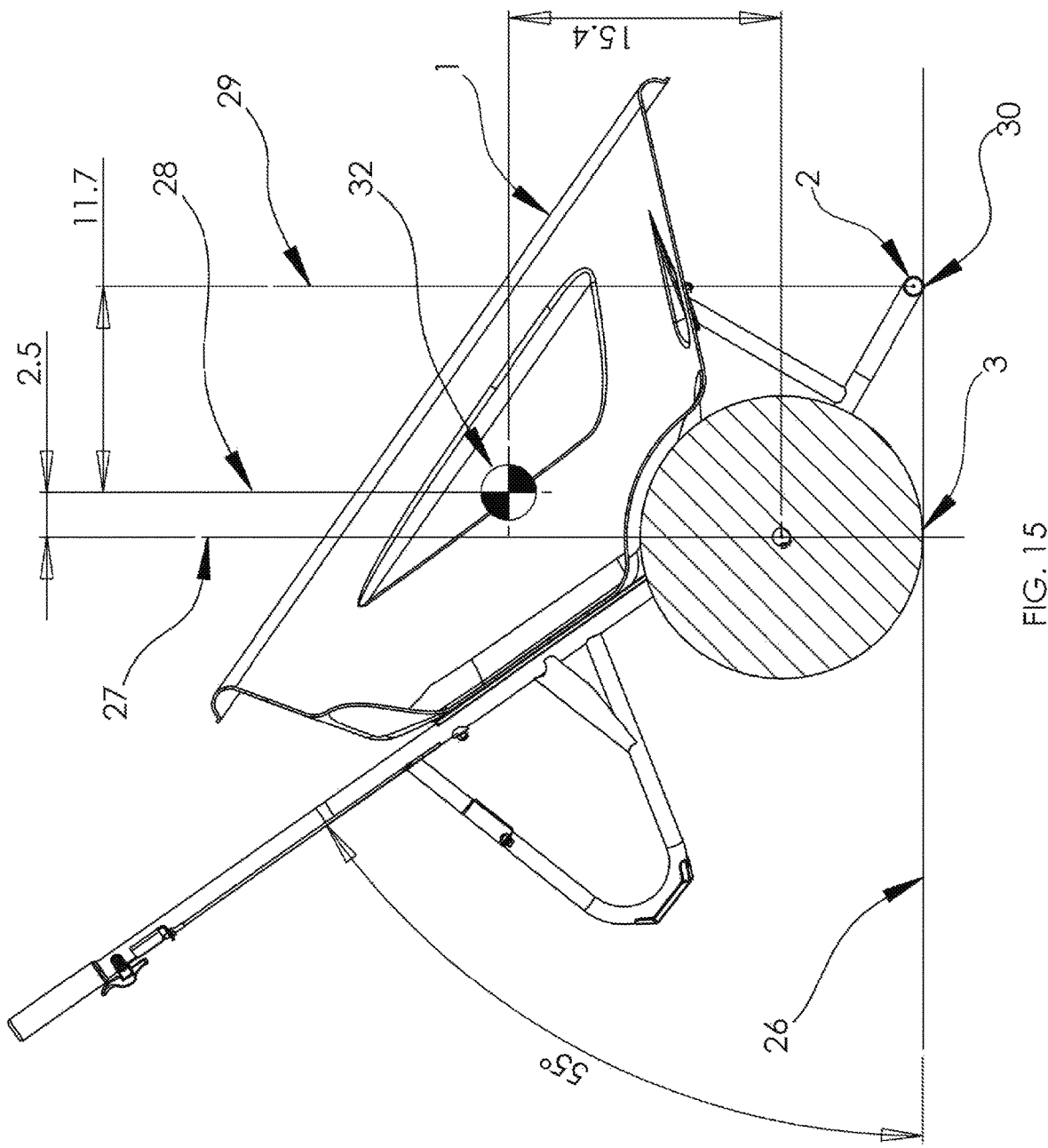
FIG. 15 is a cross-section view of the wheelbarrow in FIG. 1 (with engine and transmission removed) showing the location of the drive wheel in relation to the center of gravity of the tub while the wheelbarrow is in a middle dumping position.

FIG. 15 shows the wheelbarrow in a middle dumping position. In this example, the handle grips 8 are approximately 55 degrees from horizontal (or ground 26). Since the axis of the drive wheel 3 is located under the center of gravity 32 and thus the load instead of out front, the dump action is easier than a traditional wheelbarrow. As the operator lifts the handles, the center of gravity 32 easily moves forward of the drive wheel axis (or vertical line or plane 27) allowing gravity to assist with the dumping motion until the front frame 2 touches the ground 26 at point 30 as shown. Vertical line or plane 29 extends vertically from point 30. Once frame 2 comes in contact with the ground 26 at point 30, the distance of the center of gravity 32 from vertical line or plane 27 bisecting the axis of rotation drive wheel 3 is approximately 2.5 inches. In other words, the distance between the center of gravity 32 and vertical line or plane 27 is less than the radius of drive wheel 3. In other examples, the distance between the center of gravity 32 and vertical line or plane 27 can be approximately equal to or less than the radius of drive wheel 3. Further, the center of gravity 32 is approximately 15.4 inches from, or above a horizontal line or plane bisecting, the rotational axis of drive wheel 3. In other words, the distance between the center of gravity 32 and a horizontal line or plane bisecting the rotational axis of drive wheel 3 is less than the diameter of drive wheel 3. In other examples, the distance between the center of gravity 32 and a horizontal line or plane bisecting the rotational axis of drive wheel 3 can be approximately equal to or less than the diameter of drive wheel 3. Additionally, the center of gravity 32 from vertical line or plane 29 is approximately 11.7 inches. In this position, the dumping motion is slowed and additional force from the operator is needed to complete the dumping motion of the wheelbarrow.

Figure 16:
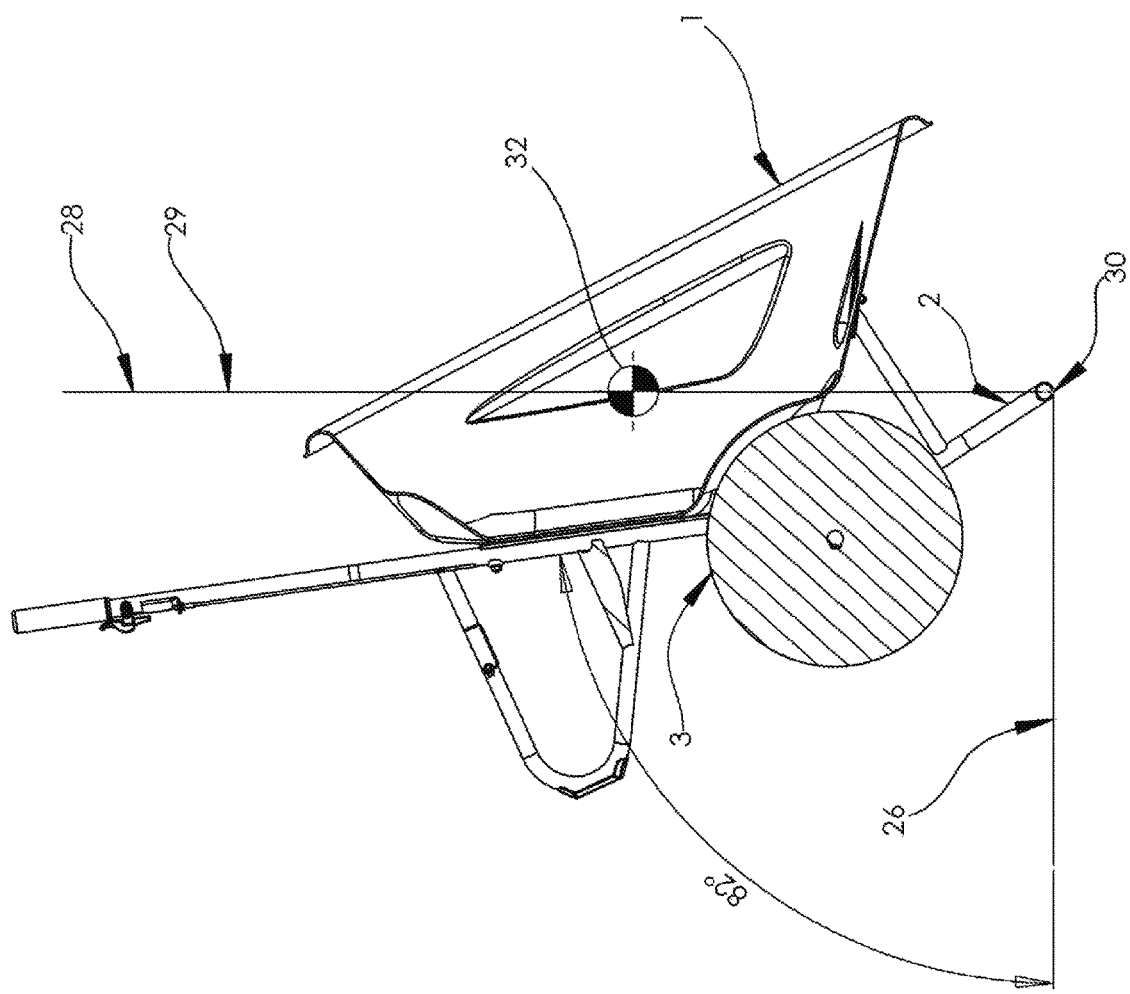
FIG. 16 is a cross-section view of the wheelbarrow in FIG. 1 (with engine and transmission removed) showing the location of the drive wheel in relation to the center of gravity of the tub while the wheelbarrow is in a full dump position.

FIG. 16 shows the wheelbarrow in a full dumping position. In this example, the handle grips 8 are approximately 82 degrees from horizontal (or ground 26). The center of gravity 32 is balanced over the point where the frame 2 contacts the ground 26 and point 30 along vertical line or plane 28 and vertical line or plane 29. Thus, vertical line or plane 28 and vertical line or plane 29 are coextensive in the position shown in FIG. 16. At this position, the unit is able to fully dump the load being transported as shown.

Figure 17:
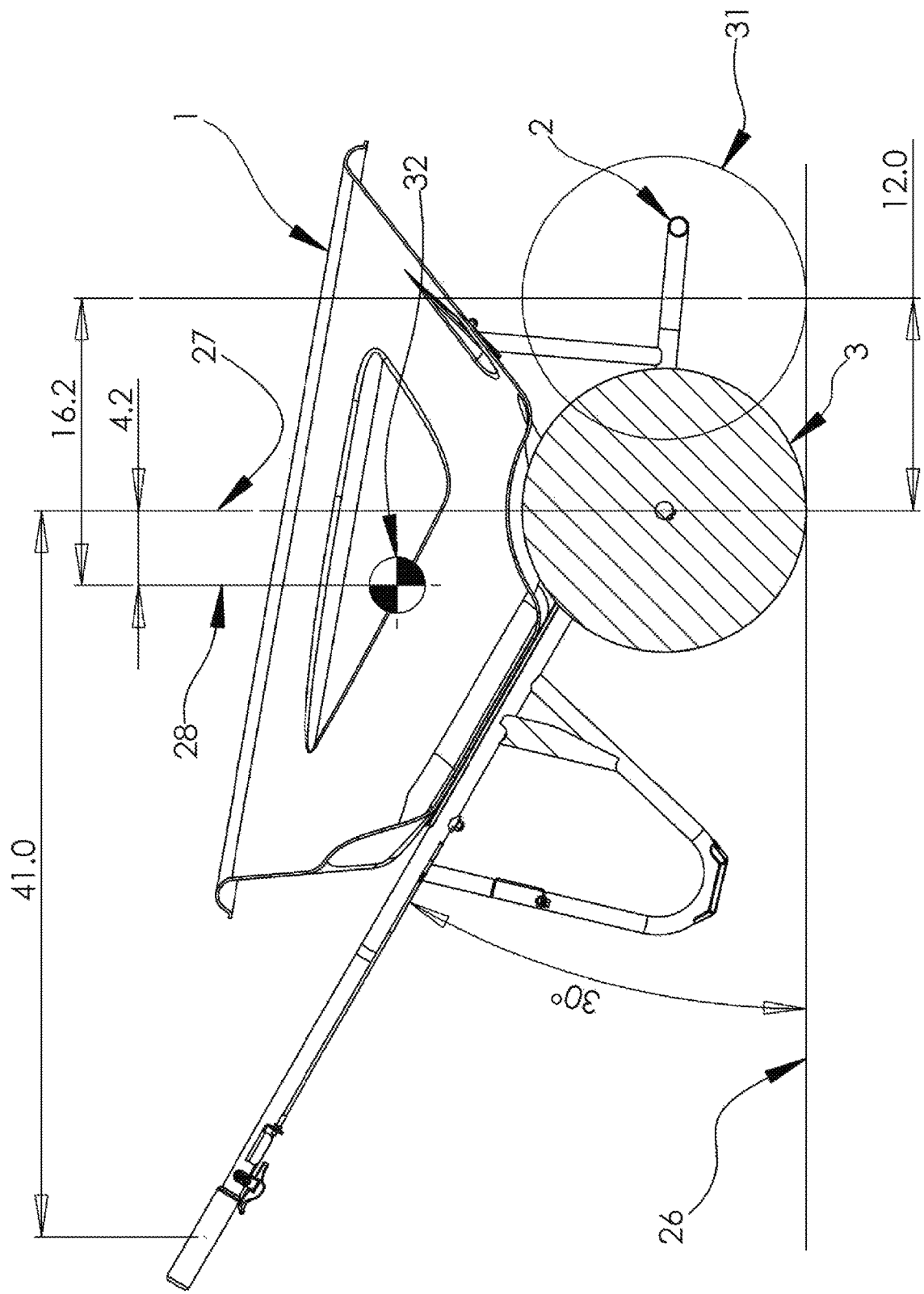
FIG. 17 is a cross-section of the wheelbarrow in FIG. 1 (with engine and transmission removed) showing the location of the drive wheel in relation to the center of gravity of the tub while the wheelbarrow is in a transport positions as compared to a traditional load carrying wheel position.

FIG. 17 shows a cross-section of the powered wheelbarrow 25 in the transport position, in relation to a load bearing wheel 31 in a traditional wheelbarrow. In this example, the axis of load bearing wheel 31 is 12 inches forward of the axis of drive wheel 3 of the powered wheelbarrow 25. In this example, the powered wheelbarrow 25 has more than twice the mechanical advantage (41/4.2=9.76 for the powered wheelbarrow 25 as compared to 57.2/16.2=3.53 for the traditional wheel location 31) to carry heavier loads than a wheel barrow with the load bearing wheel 31 out front as shown. Moving the wheel rearward and under the center of gravity has greatly increased the handling and load capacity of the powered wheelbarrow over traditional powered or non-powered wheelbarrows.

What is claimed is:

1. A wheelbarrow comprising:
   a frame;
   a tub mounted to said frame;
   a wheel;
   a motor or engine;
   wherein said tub has a recess;
   wherein at least a portion of said wheel is positioned within said recess; and
   wherein at least a portion of said frame and at least a portion of said tub extend forward of said wheel.

2. The wheelbarrow of claim 1 wherein a distance between a center of gravity of said tub and a vertical line or plane bisecting a rotational axis of said wheel when said wheelbarrow is in a resting position is approximately equal to or less than a radius of said wheel.

3. The wheelbarrow of claim 1 wherein said wheel is powered.

4. The wheelbarrow of claim 1 further comprising a transmission.

5. The wheelbarrow of claim 4 wherein said transmission is a hydrostatic drive.

6. The wheelbarrow of claim 4 wherein said transmission is capable of rotating said wheel in both a forward direction and in a reverse direction.

7. The wheelbarrow of claim 1 wherein said frame includes at least one handle grip and wherein said motor or engine is controlled by at least one control lever.

8. The wheelbarrow of claim 7 wherein said at least one control lever is located adjacent to said at least one handle grip.

9. A wheelbarrow comprising:
a frame;
a tub mounted to said frame;
a wheel;
a motor or engine;
wherein at least a portion of said wheel is positioned within a recess of said tub; and
wherein said wheel is powered.

10. The wheelbarrow of claim 9 wherein at least a portion of said frame and at least a portion of said tub extend forward of said wheel.

11. The wheelbarrow of claim 9 wherein a distance between a center of gravity of said tub and a vertical line or plane bisecting a rotational axis of said wheel when said wheelbarrow is in a resting position is approximately equal to or less than a radius of said wheel.

12. The wheelbarrow of claim 9 further comprising a transmission.

13. The wheelbarrow of claim 12 wherein said transmission is a hydrostatic drive.

14. The wheelbarrow of 14 wherein said transmission is capable of rotating said wheel in both a forward direction and in a reverse direction.

15. The wheelbarrow of claim 12 wherein said frame includes at least one handle grip and wherein said transmission is controlled by at least one control lever.

16. The wheelbarrow of claim 15 wherein said at least one control lever is located adjacent to said at least one handle grip.

* * * * *